United States Patent [19]

Carlson

[11] Patent Number: 4,547,239
[45] Date of Patent: Oct. 15, 1985

[54] METHOD FOR ATTACHING A FITTING TO A CONDUIT OF A PUSH-PULL CONTROL

[75] Inventor: John A. Carlson, Conroe, Tex.
[73] Assignee: Teleflex Incorporated, Limerick, Pa.
[21] Appl. No.: 630,953
[22] Filed: Jul. 16, 1984
[51] Int. Cl.⁴ ............................................. B29C 27/08
[52] U.S. Cl. .................... 156/73.5; 156/293; 156/294; 264/68; 264/249
[58] Field of Search .............. 156/73.5, 293, 294, 156/580, 423; 264/68, 249; 425/392, 402, DIG. 22; 228/2

[56] References Cited

U.S. PATENT DOCUMENTS

| | | | |
|---|---|---|---|
| 2,933,428 | 4/1960 | Mueller | 154/116 |
| 3,395,591 | 8/1968 | Shaeffer | 156/294 |
| 3,434,501 | 3/1969 | Conrad | 138/109 |
| 3,435,107 | 3/1969 | Conrad | 264/159 |
| 3,917,497 | 11/1975 | Stickler | 156/294 |
| 3,994,515 | 11/1976 | Cotten | 156/294 |
| 4,441,951 | 4/1984 | Christinger | 156/293 |

Primary Examiner—Michael Wityshyn
Attorney, Agent, or Firm—Harold W. Milton, Jr.

[57] ABSTRACT

A motion-transmitting remote control assembly of the type including a flexible motion-transmitting core element movably supported in a conduit (28) supported by a fitting (12). A helical groove (24) is formed in a bore (14) in the fitting (12) and a raised helical ridge (30) extends radially from the conduit (28) and fills the helical groove (24) to provide retention of the conduit (28) within the bore (14) of the fitting (12). An apparatus (10) and method for attaching the fitting (12) to the conduit (28) wherein the fitting (12) is rotatably supported by a mandrel (82) as the conduit (28) is clamped (42) and forced into the bore whereby frictional engagement with the bore (14) of specific configuration causes the material of the conduit (28) to soften and move radially outwardly (30) to fill the helical groove (24).

7 Claims, 5 Drawing Figures

METHOD FOR ATTACHING A FITTING TO A CONDUIT OF A PUSH-PULL CONTROL

TECHNICAL FIELD

The subject invention relates to a method for assembling a motion-transmitting remote control assembly. More specifically, the instant invention relates to a method for attaching a fitting to a conduit in a push-pull remote control assembly of the type having a support fitting attached to a conduit which movably supports a flexible motion-transmitting core element for movement in a curved path.

BACKGROUND ART

Prior art remote control assemblies having a fitting attached to a conduit has been manufactured using both molding and frictional welding techniques. In the former category, U.S. Pat. Nos. 3,434,501 and 3,435,107 both granted Mar. 25, 1969 in the name of W. B. Conrad are examples of a conduit having annular grooves in the surface thereof and a fitting molded about the conduit to effect an interlocking mechanical attachment. In the latter category, U.S. Pat. No. 2,933,428 granted Apr. 19, 1960 in the name of F. H. Mueller discloses an apparatus and method for frictional welding of a plastic fitting and a plastic conduit composed of the same material such as a polyvinyl chloride.

With respect to the frictional welding of plastic components described in the U.S. Pat. No. 2,933,428 patent cited above, a fitting is mounted on a chuck, in a fashion similar to that of a socket upon a socket wrench, for rotation by a drive shaft. The end of a plastic pipe is then manually moved axially and inwardly with respect to the fitting or socket as the parts are relatively rotated at high speed. When this is done, frictional heat generated at the respective surfaces of the adjoining plastic parts rapidly softens the plastic surfaces by local heat. As the pipe is forced inwardly of the socket, this heat is sufficient to cause an almost instantaneous welding together of the identical materials comprising the surfaces of the contacting parts. This is generally referred to as a "true" weld in that the similar materials of the pipes and sockets are heated and fused together so that there is no distinction between the material of the socket and that of the pipe at the point of the bond.

STATEMENT OF INVENTION AND ADVANTAGES

The invention includes a method for forming a motion-transmitting remote control assembly of the type having a fitting with a bore extending therethrough with a shoulder separating a large diameter portion having a helical groove therein from a small diameter portion and a conduit attached to the fitting within the large diameter portion of the bore up to the shoulder. The method comprises the steps of establishing relative rotation between the fitting and the conduit about the axis of the bore and establishing relative longitudinal movement between the conduit and the fitting to move the the conduit into the bore to engage the bore and soften the material of the conduit by friction to fill the groove and terminating the relative rotation with the end of the conduit engaging the shoulder.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
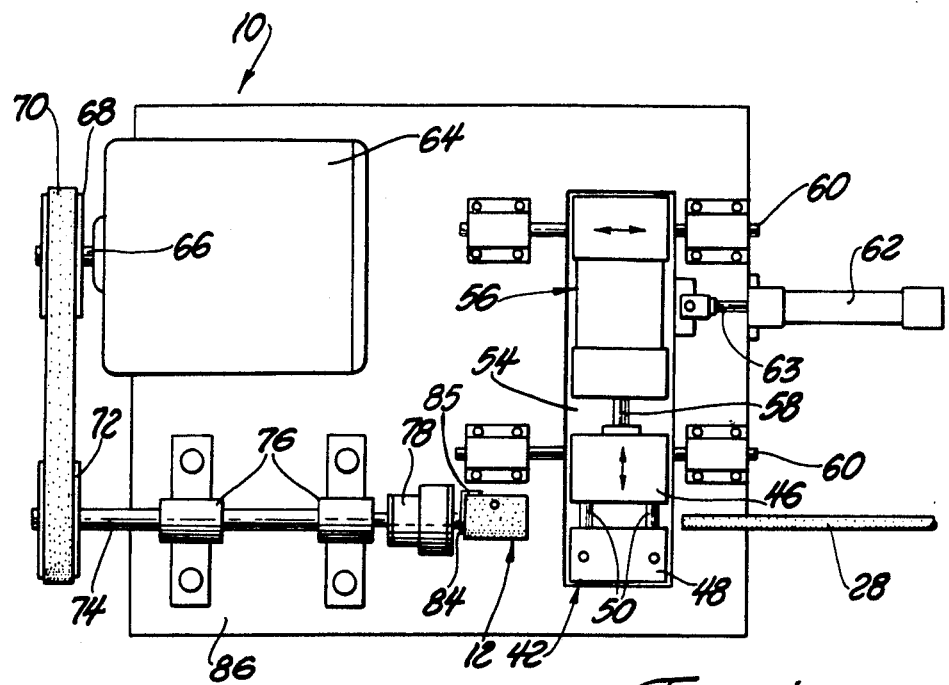
FIG. 1 is a plan view of an apparatus for attaching a fitting and a conduit prior to inserting the conduit therein.
Figure 2:
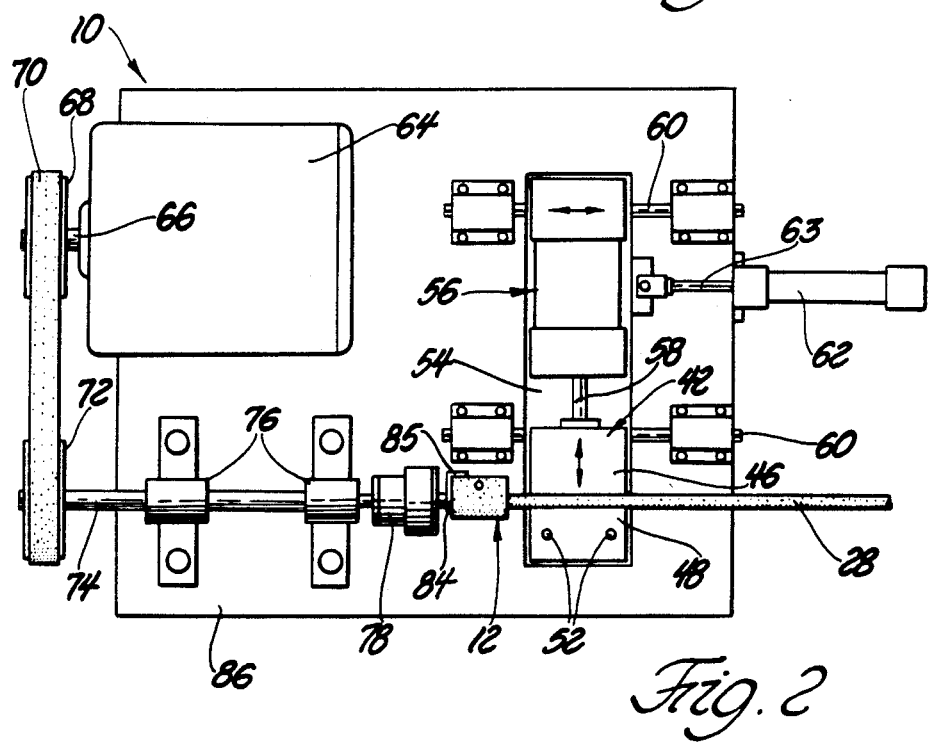
FIG. 2 is a plan view of the apparatus showing the conduit in the fitting.
Figure 4:
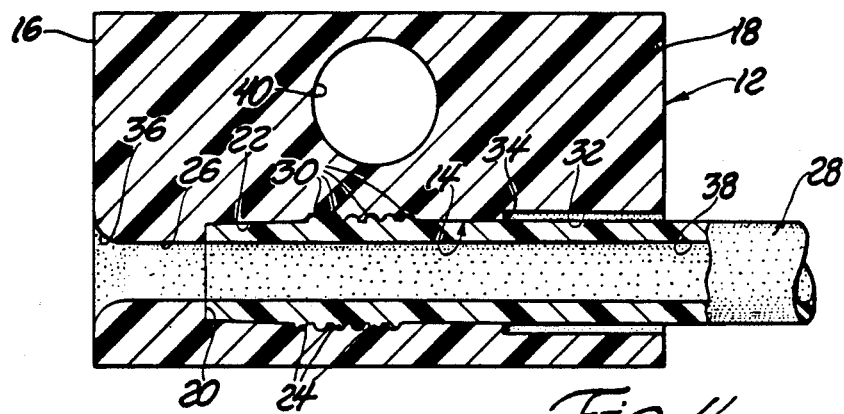
FIG. 4 is a cross-sectional view of the conduit and fitting.
Figure 5:
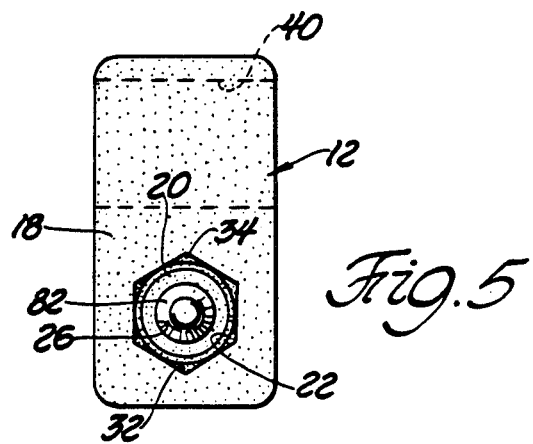
FIG. 5 is a view taken substantially along the lines 5—5 of FIG. 3.

An apparatus for assembling a motion-transmitting remote control assembly is generally shown at 10 in FIGS. 1 and 2. The apparatus 10 is particularly suited to make a motion-transmitting remote control assembly of the type shown in FIGS. 3 through 5 and having a fitting, generally indicated at 12, with a bore, generally indicated at 14, extending completely therethrough from one end 16 to the other end 18. A shoulder 20 in the bore 14 separates a large diameter portion 22 having a helical groove 24 therein from a small diameter portion 26. A conduit 28 is attached to the fitting 12 within the large diameter portion 22 of the bore 14 and extends to its end abutting the shoulder 20. As is well-known in the art, a motion-transmitting core element in the form of a wire or cable (not shown) is movably supported in the conduit with one end extending from the conduit and the end 16 of the fitting 12.

The conduit 28 has a raised helical ridge or rib 30 extending radially above or outwardly from the outer diameter or surface of the conduit 28 and filling the helical groove 24 in the bore 14. The bore 14 also includes an entry portion 32, of polygonal, e.g., hexagonal, cross section surrounding the outer diameter of the conduit 28; however, the entry portion 32 need not be polygonal. The large diameter portion 22 extends from the entry portion 32 to the shoulder 20 and the small diameter portion 26 extends from the entry portion 32 to the shoulder 20, thence through the remainder of the fitting 12 to its end or extremity 16.

A tapered portion 34 interconnects or extends between the hexagonal entry portion 32 and the large diameter portion 22. Consequently, the flats of the hexagonal entry portion 32 are tangent to and engage the sides of the conduit 28 and the tapered portion funnels or concentrically guides the entry end of the conduit 28 into the large diameter portion 22 of the bore 14 so that the large diameter portion 22 tightly engages the outer diameter or surface of the conduit 28.

The fitting 12 includes a trumpet-like portion 36 at the terminal end of the small diameter portion 26 of the bore 14, i.e., the portion 36 constantly curves or flares outwardly so there is an absence of line contact with the core element. The small diameter portion 26 of the bore 14 is of the same diameter as the inner diameter 38 of the conduit 28. The small diameter portion 26 of the bore 14 decreases in diameter slightly from the termination of the helical groove 24 and the shoulder 20 so that the end of the conduit 28 is tapered so as to mate therewith. The fitting 12 also includes attachment means comprising a hole 40 extending through the fitting for attaching the assembly to a support structure.

The apparatus 10 includes a clamping means, generally indicated at 42, for clamping the conduit 28 so as to extend therefrom and for thereafter releasing a conduit 28. The apparatus 10 is shown in the unclamped or release position in FIG. 1 prior to the insertion of the conduit 28. The clamping means 42 includes a pair of jaws 46 and 48 connected by clamping guide members 50, in the form of rods extending between and slidably connecting the jaws 46 and 48 to guide them during the clamping and releasing (back and forth as shown by the arrows) of a conduit 28 therebetween. One of the jaws 48 is fixed by bolts 52 to a bed 54 with the rods 50 extending therefrom and slidably supporting the movable jaw 46 for movement relative to the bed 54. The rods 50 also vertically locate the conduit in grooves in the clamping jaws 46 and 48. Of course, both of the jaws 46 and 48 could be movable toward and away from one another to clamp the conduit 28; this variation would naturally entail other structural modifications such as would be readily apparent to those skilled in the art.

The apparatus 10 also includes actuation means, generally indicated at 56, operatively connected to the clamping means 42 for actuating the jaws 46 and 48 of the clamping means 42 to clamp and release the conduit 28. The actuation means 56 includes a first air or hydraulic cylinder mounted on the bed 54 with a piston rod 58 extending therefrom. The distal end of the rod 58 is operatively connected to the jaw 46 to move the jaw 46 toward and away from the jaw 48 (arrows). As shown in FIG. 1, the jaws 46 and 48 are in the unactuated or release position prior to entry and clamping of the conduit 28 therebetween. As shown in FIG. 2, the jaws 46 and 48 are actuated to clamp the conduit 28.

The bed 54 is slidably supported for longitudinal or rectilinear movement along a pair of linear bearings 60 as it supports both the clamping means 42 and actuation means 56 for longitudinal movement of the clamping means 42 together with the actuation means 56 in a direction parallel to the longitudinal axis of the conduit.

The apparatus 10 also includes positioning means including a second air or hydraulic cylinder 62 having a rod 63 extending therefrom, one end of the rod 63 being operatively connected to the bed 54 in order to move the bed 54 longitudinally in a direction parallel to the linear guide means 60, that is, in the direction of the axis of the bore of the fitting and the concentric conduit.

The apparatus 10 includes a drive means comprising an electric motor 64 for rotating a drive shaft 66 having a drive pulley 68 attached thereto. A belt 70 is entrained about the drive pulley 68 and a driven pulley 72 which, in turn, rotates a shaft 74 in the same hand or direction as the helical groove 24. The shaft 74 is rotatably supported in bearing blocks 76 and supports a chuck and clutch 78 having a mandrel assembly 80 extending therefrom. The mandrel assembly 80 includes a mandrel 82 having a pointed end for insertion into the small diameter portion 26 of the bore 14 for supporting the fitting 12 during rotation. The mandrel assembly 80 includes a flange 84 for abutting the end 16 of the fitting 12 and an extension finger or driving dog 85 engaging the top face of the fitting to cause rotation of the fitting. The entire apparatus is mounted on a platform 86.

The conical portion 36 guides the fitting 12 onto the mandrel 82. The mandrel 82 is in frictional engagement with the small diameter portion 26 of the bore 14 and when fully inserted extends into the large diameter portion 22 to engage and fill the interior of the bore of the conduit 28 to prevent the conduit 28 from collapsing, melting closed or flashing, and to otherwise maintain the inner diameter of the conduit equal to the diameter of the small diameter portion 22 of the bore 14 as the end of the conduit 28 is inserted into the bore 14 and forced into the tapered portion extending between the shoulder 20 and the helical groove 24. The end of the mandrel forces the outer surface of the conduit outward into contact with the fitting and prevents debris from entering the conduit bore.

In operation, a fitting 12 is forced onto the rounded end of the mandrel 82 until it abuts the flange 84 with the driving dog 85 engaging the fitting whereupon relative rotation is established by engagement of a clutch with the drive means. A conduit 28 is then placed between the jaws 46 and 48 which are actuated to clamp the conduit 28. The bed 54 is then moved longitudinally by the positioning means 62 so that the closed jaws 46 and 48 having the conduit 28 protruding therefrom are advanced toward the rotating bore 14 of the fitting 12. Longitudinal movement of the conduit 28 into the bore 14 of the fitting 42 (FIG. 2) continues until attachment takes place at which time the clutch is disengaged to stop the relative rotation.

Upon application of electrical power to the motor 64, it rotates shaft 74 through pulleys 68 and 72 with belt 70 entrained thereabout. At this point the clutch 78 is disengaged and the chuck 84 is not rotating. The fitting 12 is pushed onto the mandrel 80 until the top face of the fitting 12 engages the stop or driving dog 85. The conduit 28 is loaded onto the jaws 46 and 48. A switch (not shown) is operated to initiate or start a timer (not shown) controlling the sequence of the entire cycle. The clutch 78 is engaged to rotate chuck 84 which, in turn, rotates fitting 12. Simultaneously, a solenoid valve operates to actuate the clamp cylinder 56 to clamp conduit 28. As conduit clamp 46 contacts conduit 28, pressure builds up in clamp cylinder 56 to a predetermined level at which a pressure sensitive valve (not shown) opens, allowing air pressure to operate cylinder 62. Cylinder 62 moves carriage 54 to move conduit 28 into bore 14 of the rotating fitting 12. The insertion of the conduit 28 into the bore 14 continues in the axial direction until a positive stop in the carriage 54 is engaged, a stop the position of which is adjustable so that the end of the conduit 28 may or may not engage the shoulder 20. The clutch 78 is disengaged, stopping rotation of the fitting 12 relative to the conduit 28 at the same time the solenoid valve operates to unclamp the clamp cylinder 56 and return carriage cylinder 62. The assembly is removed from the apparatus which is ready for the next cycle.

Figure 3:
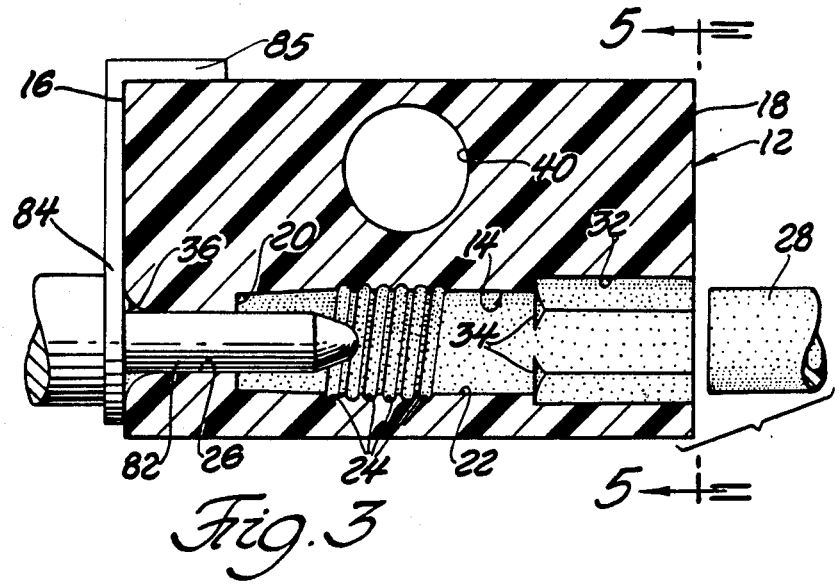
FIG. 3 is a fragmentary cross-sectional view showing the helically grooved bore of the fitting supported by a mandrel.

More specifically, the method comprises the steps of establishing relative rotation between the fitting 12 and the conduit 28 about the axis of the bore 14 extending through the fitting 12 and establishing relative longitudinal movement between the conduit 28 and the fitting 12 to move the conduit 28 into the bore 14 to engage the bore 14 and softening the material of the conduit 28 by friction to fill the groove 24 in the bore 14 and terminating the relative rotation with the end of the conduit 28 engaging the shoulder 20. In other words, the softening or melting temperature of the conduit is less than that of the fitting and the smooth outer surface of the conduit deforms into a ridge filling the groove in the fitting. The inner diameter of the conduit bore is maintained constant by the mandrel during the softening thereof and is not deformed in the process. This is due to lesser heat proliferation at a point near the inner diameter of the conduit and to the supporting action of the mandrel 82 which extends through the small diameter portion 26 and into the conduit bore which is in registration therewith as shown in FIG. 3.

The mandrel 82 is guided into the small diameter portion 26 by the pointed end thereof entering the conical portion 36 as the fitting 12 is initially placed upon the mandrel 82 until the end 16 of the fitting 12 engages the flange 84 with the mandrel 82 extending into the large diameter portion 22. The conduit 28 is moved into the bore 14 by the distal end entering the entry portion 32 of the bore 14 where the flats of the hexagonal shape minimally and tangentially engage the conduit 28 and the end of the conduit 28 is concentrically guided into the large diameter portion 22 so as to be in frictional engagement therewith. The frictional engagement causes softening of the material of the conduit 28 into a sufficiently amorphous condition for the material to gather and extend radially outwardly to fill the helical groove 24, the helical lead of the groove 24 being important to this formation as the conduit 28 and fitting 12 are rotated relative to one another about the axis of the bore 14. In this regard, the helical configuration aids in the forming process, although it should be understood that the grooves could be annular. As the conduit 28 is moved into the fitting 12 the mandrel 82 is forced or driven into the inner diameter or bore of the conduit 28 for maintaining its diameter constant, i.e., to prevent its radial collapse to provide intimate contact with the bore of the fitting.

The attachment of a fitting to a conduit in the above-described manner creates improved stress relief in the resultant assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A method for assembling a motion-transmitting remote control assembly of the type having a fitting (12) with a bore (14) extending therethrough with a shoulder (20) separating a large diameter portion (22) having a helical groove (24) therein from a small diameter portion (26) and a conduit (28) attached to the fitting (12) within the large diameter portion (24) of the bore (14) up to the shoulder (20), said method comprising the steps of: establishing relative rotation between the fitting (12) and the conduit (28) about the axis of the bore (14) and establishing relative longitudinal movement between the conduit (28) and the fitting (12) to move the said conduit (28) into the bore (14) to engage the bore (14) and soften the material of the conduit (28) by friction to fill the groove (24) and terminating the relative rotation with the end of the conduit (28) engaging the shoulder (20).

2. A method as set forth in claim 1 further characterized by maintaining the inner diameter of the conduit (28) constant during the softening of the exterior thereof.

3. A method as set forth in claim 2 further characterized by inserting a mandrel (82) through the small diameter portion (26) of the bore (14) and into the large diameter portion (22) of the bore (14) and driving the conduit (28) onto the mandrel (82) for maintaining the inner diameter thereof.

4. A method as set forth in claim 3 further characterized by concentrically guiding the end of the conduit (28) into the large diameter portion (22) of the bore (14).

5. A method as set forth in claim 4 wherein an entry portion (32) of said continuous bore (14) is of generally polygonal cross section and has flat surfaces tangentially engaging the outer surface of the conduit (28) and characterized by providing minimal frictional contact between the outer surface of the conduit (28) and the flat surfaces for the purpose of concentric engagement of said fitting and said conduit.

6. A method for assembling a fitting (12) with a bore (14) extending therethrough and a helical groove (24) therein to a conduit (28) within the bore (14), said method comprising the steps of: establishing relative rotation between the fitting (12) and the conduit (28) about the axis of the bore (14) and establishing relative longitudinal movement between the conduit (28) and the fitting (12) to move the said conduit (28) into the bore (14) to engage the bore (14) and soften the material of the conduit (28) by friction to fill the groove (24) and terminating the relative rotation with the end of the conduit (28) engaging the shoulder (20).

7. A method as set forth in claim 6 wherein a fitting is attached to a conduit and characterized by creating a stress relief in the resultant assembly.

* * * * *